US012565251B2

(12) United States Patent
Pitts

(10) Patent No.: US 12,565,251 B2
(45) Date of Patent: Mar. 3, 2026

(54) A-FRAME WIRE PULL CART

(71) Applicant: Envision Tools, LLC, Eagle Mountain, UT (US)

(72) Inventor: Jonathan Pitts, Eagle Mountain, UT (US)

(73) Assignee: Envision Tools, LLC, Eagle Mountain, UT (US)

( * ) Notice: Subject to any disclaimer, the term of this patent is extended or adjusted under 35 U.S.C. 154(b) by 307 days.

(21) Appl. No.: 18/322,396

(22) Filed: May 23, 2023

(65) Prior Publication Data

US 2024/0391512 A1      Nov. 28, 2024

(51) Int. Cl.
B62B 3/10          (2006.01)
B62B 3/04          (2006.01)
B65H 49/32         (2006.01)
B65H 49/38         (2006.01)

(52) U.S. Cl.
CPC .................. B62B 3/10 (2013.01); B62B 3/04 (2013.01); B62B 3/104 (2013.01); B65H 49/32 (2013.01); B65H 49/325 (2013.01); B65H 49/38 (2013.01); B62B 2202/025 (2013.01); B62B 2501/00 (2013.01)

(58) Field of Classification Search
CPC .. B62B 2202/025; B65H 49/32; B65H 49/325
See application file for complete search history.

(56) References Cited

U.S. PATENT DOCUMENTS

| | | | | |
|---|---|---|---|---|
| 1,174,964 A | * | 3/1916 | Bradley | A47C 17/80 |
| | | | | 5/119 |
| 1,792,612 A | * | 2/1931 | Staley | B25H 1/0007 |
| | | | | 248/676 |
| 2,122,770 A | * | 7/1938 | Colin | C14B 1/26 |
| | | | | 211/208 |
| 2,551,190 A | * | 5/1951 | Walker | A47F 7/175 |
| | | | | 242/599.3 |
| 2,705,114 A | * | 3/1955 | Worsham | B65H 49/325 |
| | | | | 280/47.24 |
| 2,799,415 A | * | 7/1957 | Dean, Jr. | D02H 13/38 |
| | | | | 414/434 |
| 2,903,219 A | * | 9/1959 | Ingham, Jr. | B62B 3/08 |
| | | | | 298/2 |
| 2,999,693 A | * | 9/1961 | Thorson | F41A 9/87 |
| | | | | 280/492 |
| 3,144,914 A | * | 8/1964 | Tjosvoll | E04G 1/32 |
| | | | | 182/155 |

(Continued)

FOREIGN PATENT DOCUMENTS

| | | | | |
|---|---|---|---|---|
| DE | 102011111662 A1 | * | 2/2013 | B62B 3/104 |
| GB | 2264924 A | * | 9/1993 | A47F 7/005 |
| WO | WO-2021159172 A1 | * | 8/2021 | B65H 49/32 |

*Primary Examiner* — Emma K Frick
(74) *Attorney, Agent, or Firm* — TechLaw Ventures, PLLC; Terrence J. Edwards

(57)                ABSTRACT

Pull carts configured for holding, transporting, and storing spools of wire or cable. A cart includes an A-frame truss comprising a plurality of crosswise beams, wherein the plurality of crosswise beams comprises: a proximal end attached to a cart base, and a distal end opposite the proximal end, wherein the distal end forms an apex of the A-frame truss. The cart includes a rod support configured to receive a spool crossbar, wherein the rod support is disposed at the apex of the A-frame truss.

20 Claims, 15 Drawing Sheets

(56) References Cited

U.S. PATENT DOCUMENTS

| | | | | | |
|---|---|---|---|---|---|
| 3,330,534 | A | * | 7/1967 | Collins | E01F 13/02 |
| | | | | | D25/67 |
| 3,854,509 | A | * | 12/1974 | Bailey | B65H 49/38 |
| | | | | | 242/594.3 |
| 3,963,257 | A | * | 6/1976 | Harron | B60P 1/027 |
| | | | | | 280/43.12 |
| 4,190,283 | A | * | 2/1980 | Boucher | A63G 9/12 |
| | | | | | 403/65 |
| 4,496,028 | A | * | 1/1985 | Peterson | B25H 1/06 |
| | | | | | 182/226 |
| 4,611,645 | A | * | 9/1986 | Whisnant | B65H 49/321 |
| | | | | | 242/129 |
| 4,752,047 | A | * | 6/1988 | Franks, Jr. | B65H 49/26 |
| | | | | | 242/129.6 |
| 4,783,017 | A | * | 11/1988 | Ovitz, III | A47F 7/175 |
| | | | | | 242/423.1 |
| 5,308,012 | A | * | 5/1994 | Fuller | B65H 49/321 |
| | | | | | 242/598.5 |
| 5,377,779 | A | * | 1/1995 | Slapnicka | B25H 1/06 |
| | | | | | D25/67 |
| 5,590,435 | A | * | 1/1997 | Kostigian | A47F 7/17 |
| | | | | | 15/40 |
| 5,692,625 | A | * | 12/1997 | Filipescu | A47F 5/108 |
| | | | | | 211/85.5 |
| 5,806,787 | A | * | 9/1998 | Schneider | B65H 49/321 |
| | | | | | 242/598.5 |
| 6,170,672 | B1 | * | 1/2001 | Boettcher | A47B 81/007 |
| | | | | | 211/85.5 |
| 6,375,115 | B1 | * | 4/2002 | Reed | B65H 49/32 |
| | | | | | 242/594.4 |
| 6,471,174 | B2 | * | 10/2002 | Turner | A47B 97/04 |
| | | | | | 248/446 |
| 7,461,809 | B1 | * | 12/2008 | Maley | B65H 49/32 |
| | | | | | 242/557 |
| 7,784,729 | B1 | * | 8/2010 | Hope | B65H 49/32 |
| | | | | | 242/597.4 |
| 7,931,227 | B1 | * | 4/2011 | Oudekerk | H02G 1/08 |
| | | | | | 242/594.3 |
| 8,099,815 | B2 | * | 1/2012 | Kostigian | B65H 16/005 |
| | | | | | 15/40 |
| 8,398,013 | B2 | * | 3/2013 | Skalleberg | H02G 11/02 |
| | | | | | 242/486.2 |
| 9,079,745 | B2 | * | 7/2015 | Galindo Gonzalez | |
| | | | | | B65H 75/185 |
| 9,994,416 | B2 | * | 6/2018 | Worton | B65H 49/32 |
| 10,696,515 | B2 | * | 6/2020 | Grzybowski | B65H 75/4465 |
| 11,174,100 | B2 | * | 11/2021 | Mallady | B65F 1/1468 |
| 11,912,383 | B2 | * | 2/2024 | Sweeney | B62B 3/02 |
| 2005/0218258 | A1 | * | 10/2005 | Valerio | A47F 7/175 |
| | | | | | 242/598.4 |
| 2012/0223179 | A1 | * | 9/2012 | Galindo Gonzalez | |
| | | | | | B65H 49/325 |
| | | | | | 242/598.5 |

* cited by examiner

A-FRAME WIRE PULL CART

TECHNICAL FIELD

The present disclosure relates generally to pull carts, and in particular pull carts for transporting and storing wiring or cabling featuring an A-frame type support.

BACKGROUND

Pull carts include various hand-operated carts that may be used to transport a variety of items, such as tools, materials, and equipment. Pull carts are particularly useful in warehouses and constructions sites, where heavy or cumbersome materials must be transported and maneuvered through rooms and obstacles. Pull carts are manufactured with various configurations and typically include flatbeds and shelves for carrying items of various sizes. One of the main advantages of using a pull cart is that it helps reduce strain and fatigue associated with manually carrying heavy or cumbersome items over long distances. Pull carts are also generally easier to maneuver and navigate through narrow spaces than larger vehicles such as forklifts or trucks.

In some cases, pull carts are specifically used for holding and transporting wires, such as electrical wires, fiber optic cables, coaxial cables, multicore cables, flexible cables, and so forth. Some wires can be exceedingly heavy, cumbersome, and difficult to maneuver, and this is particularly true for wires used in outdoor construction projects and commercial building construction projects.

However, traditional pull carts are inadequate for transporting heavy wires, and present numerous issues, including issues relating to stability, capacity, maneuverability, and compatibility. Traditional pull carts have limited stability when used to carry heavy wires, and particularly if the cart is not specifically designed to handle the weight and unique geometry of wires. This causes the wires to fall off during transport, which can potentially injure surrounding workers. Additionally, traditional pull carts are not large enough to hold wires and lack the capacity to carry particularly thick or heavy lengths of wire. Traditional pull carts are difficult to maneuver through tight spaces when loaded with lengths of wire. Finally, traditional pull carts are often incompatible with wire transport and do not provide adequate support or protection for the wire itself or the people transporting the pull cart.

In view of the foregoing, what is needed are improved pull carts specifically configured for holding and transporting wires. There is a need for a nimble, stable cart that can suit any job. Described herein are improved systems, apparatuses, and methods for transporting and storing wiring or cabling.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

Figure 1:
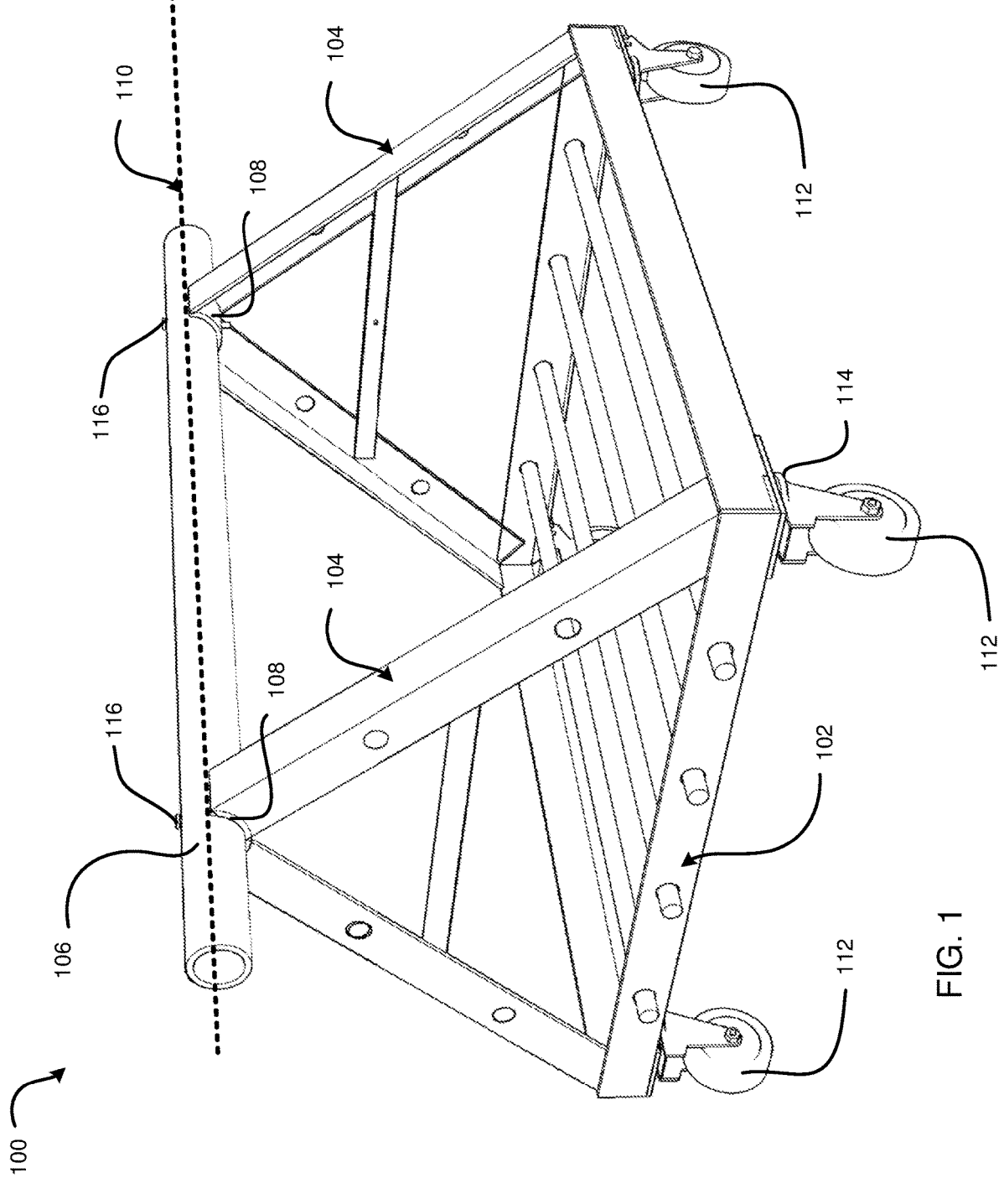
FIG. 1 illustrates a perspective view of a cart configured for transporting a spool of wire or cable.

Described herein are improved apparatuses, systems, and methods for holding, transporting, and storing lengths of wire or cable. Specifically described herein is an A-frame pull cart configured for supporting a length of wire such that the wire can easily be stored, transported, and retrieved. The A-frame pull carts described herein are capable of holding multiple spools of wire or cable enabling those spools to rotate for easily removing the wire or cable. Additionally, the A-frame pull carts described herein are configured for improved maneuverability when transporting and utilizing one or more spools of wire.

A cart described herein includes an A-frame configuration to improve the stability and maneuverability of the cart when heavy or cumbersome spools of wire are stored on the cart. The A-frame configuration is defined by two or more A-frame trusses attached to a base portion. The base portion provides stability to the cart for equally distributing the load across multiple wheels. Additionally, the base portion includes a shelf wherein an additional weight (such as, for example, containers filled with sand or water) may be disposed if necessary to reduce the likelihood that the cart will tip over when wire is unwound directly from the cart. The A-frame trusses of the cart form an apex wherein a spool crossbar may be disposed. The spool crossbar is configured to receive a spool of wire and/or provide a space for storing wire by wrapping the wire directly around the spool crossbar or hanging the wire on the spool crossbar. The carts described herein can additionally be utilized for storing numerous tools, equipment, and supplies.

In the following description of the disclosure, reference is made to the accompanying drawings, which form a part hereof, and in which is shown by way of illustration specific implementations in which the disclosure may be practiced. It is understood that other implementations may be utilized, and structural changes may be made without departing from the scope of the disclosure.

Before the methods, systems, and devices for producing a wire frame pull cart are disclosed and described, it is to be understood that this disclosure is not limited to the particular configurations, process steps, and materials disclosed herein as such configurations, process steps, and materials may vary somewhat. It is also to be understood that the terminology employed herein is used for the purpose of describing particular implementations only and is not intended to be limiting since the scope of the disclosure will be limited only by the appended claims and equivalents thereof.

In describing and claiming the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element, step, or ingredient not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

Figure 2:
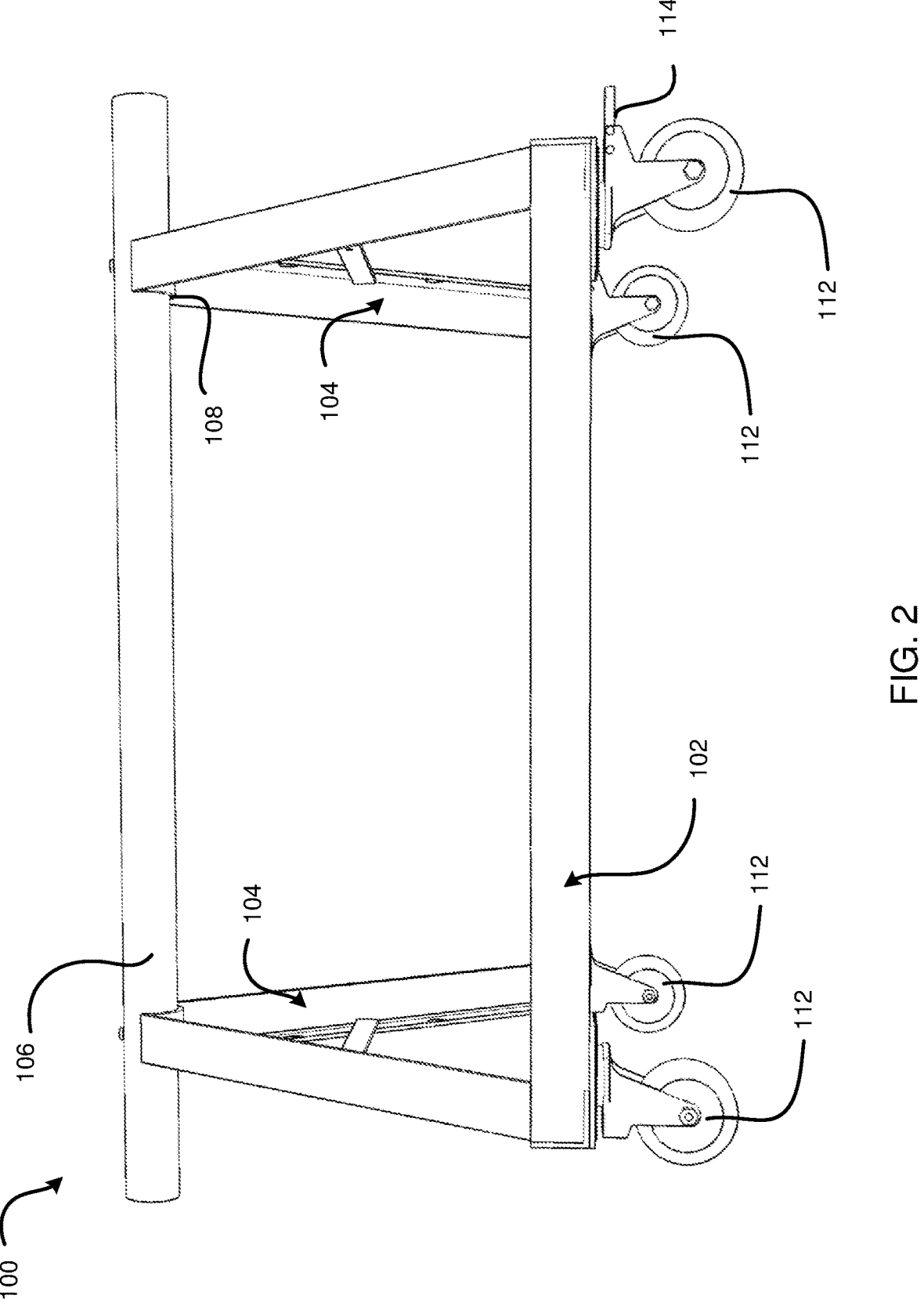
FIG. 2 illustrates a straight-on side view of a cart configured for transporting a spool of wire or cable.
Figure 3:
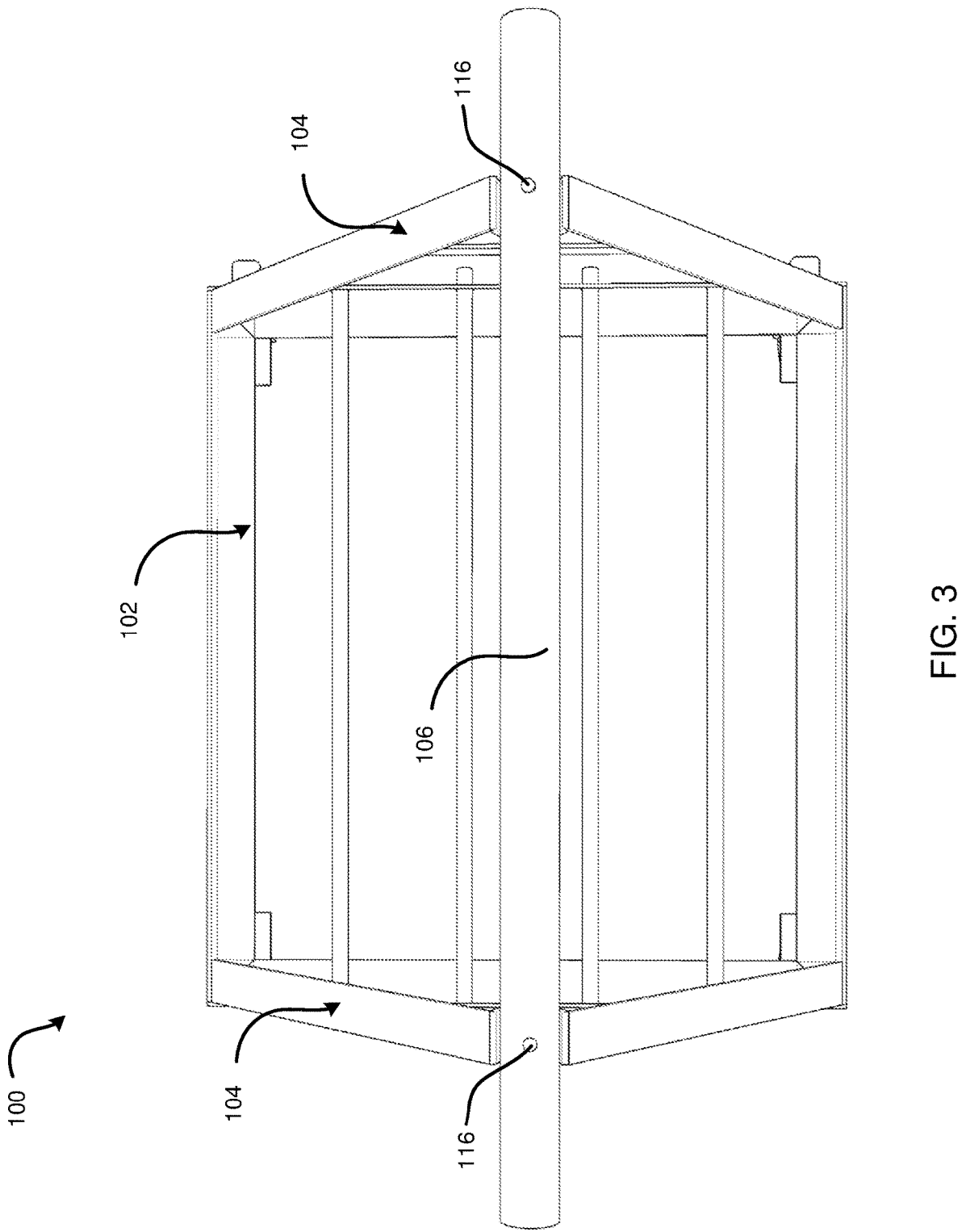
FIG. 3 illustrates a top-down aerial view of a cart configured for transporting a spool of wire or cable.
Figure 4:
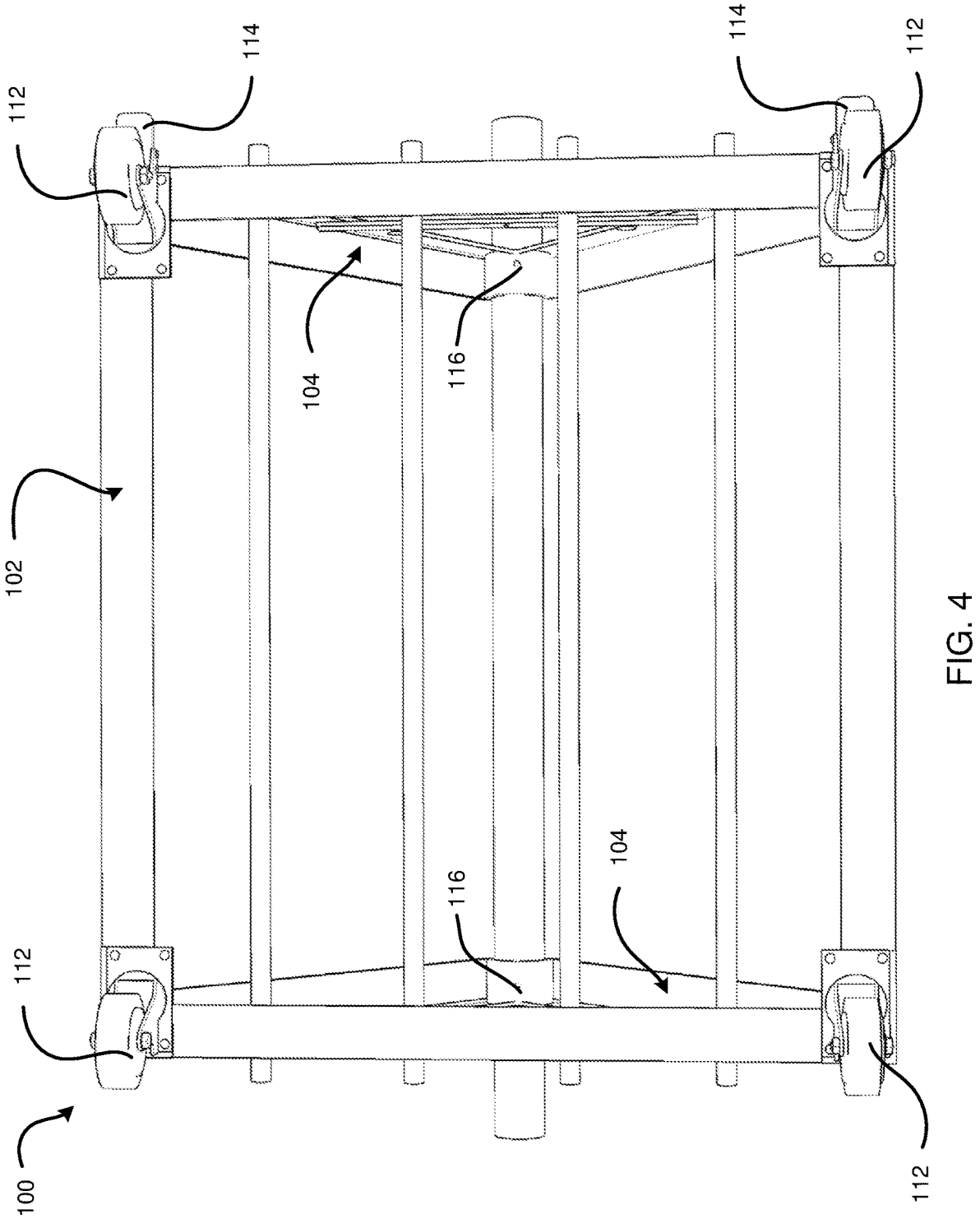
FIG. 4 illustrates a bottom-up underside view of a cart configured for transporting a spool of wire or cable.

Referring now to the figures, FIGS. 1-4 are illustrations of a cart 100. Specifically, FIG. 1 illustrates a perspective view of the cart. FIG. 2 illustrates a straight-on side view of the cart 100. FIG. 3 illustrates a top-down aerial view of the cart 100. FIG. 4 illustrates a bottom-up view of the underside of the cart 100. While the cart shown in the figures presented herein is depicted in an overall square or rectangular shape, it is understood that other proportions or shapes are contemplated without exceeding the scope of the disclosure.

The cart 100 may specifically be implemented to hold, transport, and store spools of wire or cable that may be particularly heavy and cumbersome to maneuver. The cart 100 represents an improvement over traditional wire pull carts, which are known to be difficult to maneuver. The cart 100 described herein is specifically configured to improve the stability of the cart 100 when wire is unwound from the spool or otherwise disturbed. This is a significant improvement over traditional wire pull carts, which are known to tip over when the wire is unwound, or when wire spools are adjusted or replaced.

The cart 100 includes one or more wheels 112 and wheel brakes 114 for enabling easy transport and storage of the cart 100. The cart 100 additionally includes a base portion 102 and two or more A-frame trusses 104, which will be described in further detail herein. The wheels 112 and wheel brakes 114 are affixed to the base portion 102, and the geometry of the base portion 102 is optimized to ensure improved stability of the cart even when a wire spool is unwound. The A-frame truss 104 consists of two or crosswise beams formed in an A-frame configuration. This A-frame configuration is particularly useful when seeking to store, transport, and stabilize a large and/or heavy spool of wire.

The A-frame trusses 104 of the cart 100 support a spool crossbar 106. Each of the two or more A-frame trusses 104 includes a rod support 108 that supports the spool crossbar 106 and enables the spool crossbar 106 to rotate about an axis 110 as needed. The spool crossbar 106 is configured to be disposed through an arbor shaft of a spool, such that the barrel of the spool is disposed around the spool crossbar 106. The spool crossbar 106 can easily be lifted off the rod support 108, fed through the arbor shaft of a spool, and then placed back on the rod support 108. Thus, the cart 100 is configured such that a spool may be quickly installed or removed from the cart as needed. Additionally, in other implementations, wire or cable may be wrapped around or hung directly on the spool crossbar 106 without the use of a spool.

The cart 100 includes fasteners 116 for securing the spool rod 106 to the rod supports 108. As shown in FIG. 1, the fastener 116 may include a pin configured to be disposed through one or more holes cut through the spool rod 106. In an embodiment where the spool rod 106 is hollow, the fastener 116 may be disposed through two holes located opposite each other on the spool rod 106. In an embodiment where the spool rod 106 is solid, the fastener 116 may be disposed through a through-hole cut through the entirety of the solid spool rod 106. The fastener 116 pin is configured to be disposed within a corresponding hole cut into the rod support 108 (not shown). The fastener 116 thus prevents the spool rod 106 from rotating about the axis 110 or sliding back and forth in a longitudinal direction along the axis 110.

The A-frame configuration of the A-frame trusses 104 provides increased stability to the spool crossbar 106, and this enables the cart 100 to hold a heavy or cumbersome spool of wire without tipping over when the cart 100 is transported and/or when wire is pulled off the spool. Because the spool crossbar 106 can rotate about the axis 110, wire can easily be pulled off the spool as needed without disrupting the balance of the cart. This represents a significant improvement over traditional wire carts, which are prone to tipping over when wire is unwound.

The cart 100 is manufactured with a sturdy and durable frame, which consists of the base portion 102 and the two or more A-frame trusses 104. The frame portions 102, 104 of the cart 100 are manufactured with a rigid material such as steel, aluminum, rigid polycarbonate, wood, or composite materials such as fiberglass or carbon fiber. The choice of material for manufacturing the cart 100 depends on various factors such as the intended use of the cart, the anticipated weight of the wire pool to be transported, the environment in which the cart 100 will be used, and budgetary considerations.

The cart 100 is designed to be balanced such that the weight of the spool is evenly distributed over the wheels 112. This prevents the cart 100 from tipping over when transported or when wire is unwound off the spool. Additionally, the cart 100 includes a storage region built into the base portion 102, where additional weight may be added as necessary to improve overall stability of the cart. In some cases, a bag of sand, container filled with water, or other weight may be disposed on the base portion 102 to provide additional weight and stability when the spool crossbar 106 holds a particularly heavy wire or cable.

The sizes and materials utilized for the wheels 112 of the cart are selected based on the intended use of the cart. In some cases, the cart 100 is configured with larger wheels that provide increased stability and maneuverability over uneven terrain. In other cases, the cart 100 may be configured with wheels 112 that primarily prioritize a smooth ride when navigating over smooth terrain. The wheel brakes 114 enable the cart 100 be parked on an incline or uneven surface to prevent the cart 100 from rolling away. The wheel brakes 114 are also configured to prevent the cart 100 from rolling when wire is unwound from a spool installed on the spool crossbar 106.

The stability of the cart 100 is improved through the use of the large base portion 102, which is relatively wide relative to the upper portion of the cart, which consists of the apexes of the A-frame trusses 104 and the spool crossbar 106. Additionally, the stability of the cart 100 is improved due to the A-frame configuration of the A-frame trusses 104. The A-frame configuration provides increased balance and stability for holding a heavy spool of wire on the spool crossbar 106.

Figure 5A:
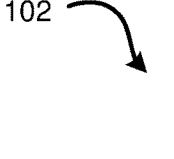
FIG. 5A is a schematic illustration of a perspective view of components of a base portion of a cart configured for transporting a spool of wire or cable.
Figure 5A:
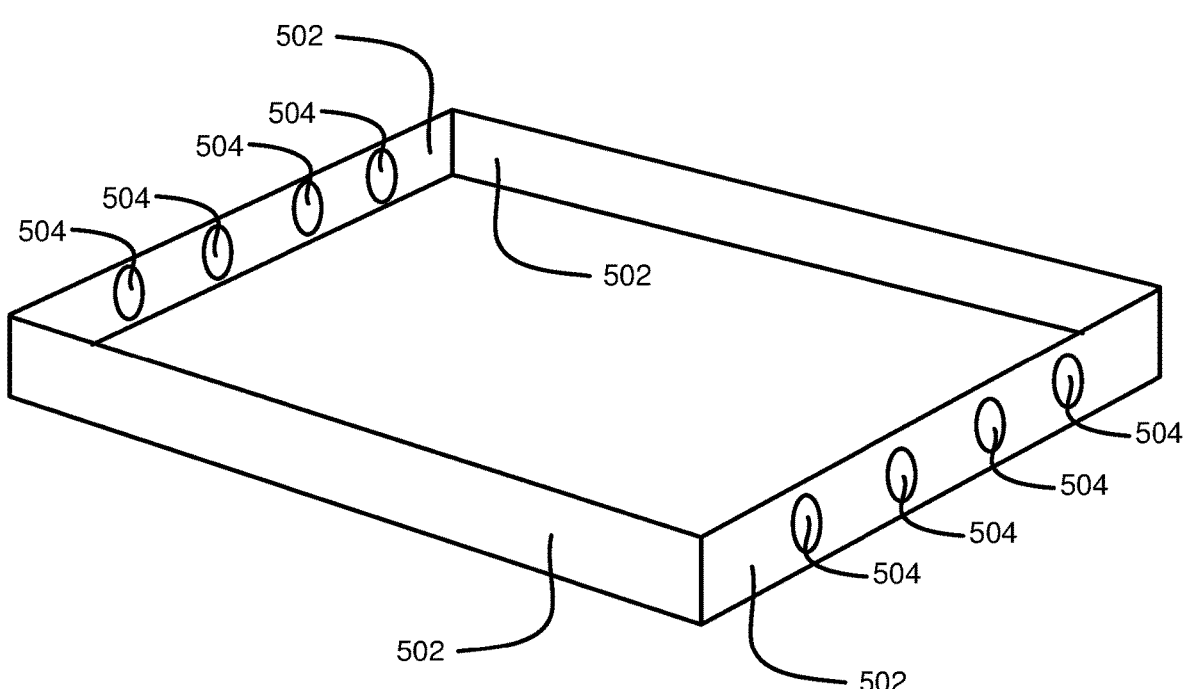
Figure 5B:
FIG. 5B is a schematic illustration of a perspective view of components of a base portion of a cart configured for transporting a spool of wire or cable.
Figure 5B:
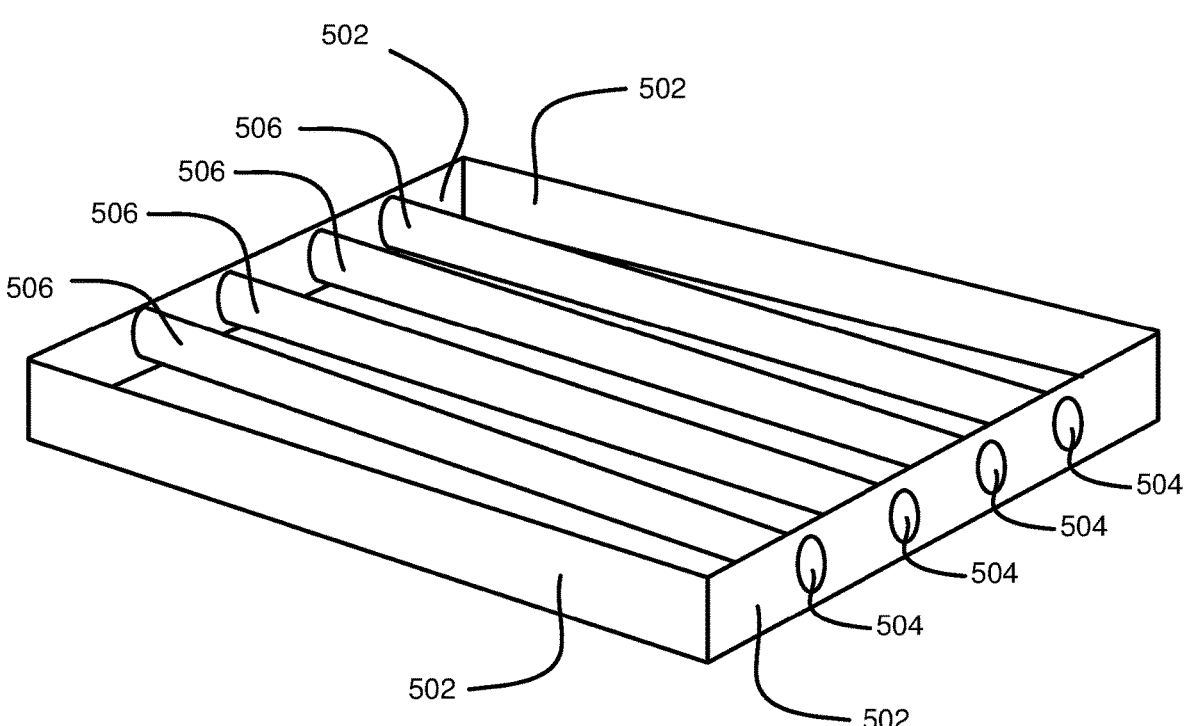
Figure 5C:
FIG. 5C is a schematic illustration of a perspective view of components of a base portion of a cart configured for transporting a spool of wire or cable, wherein one or more crossbars of the base portion are being removed.
Figure 5C:
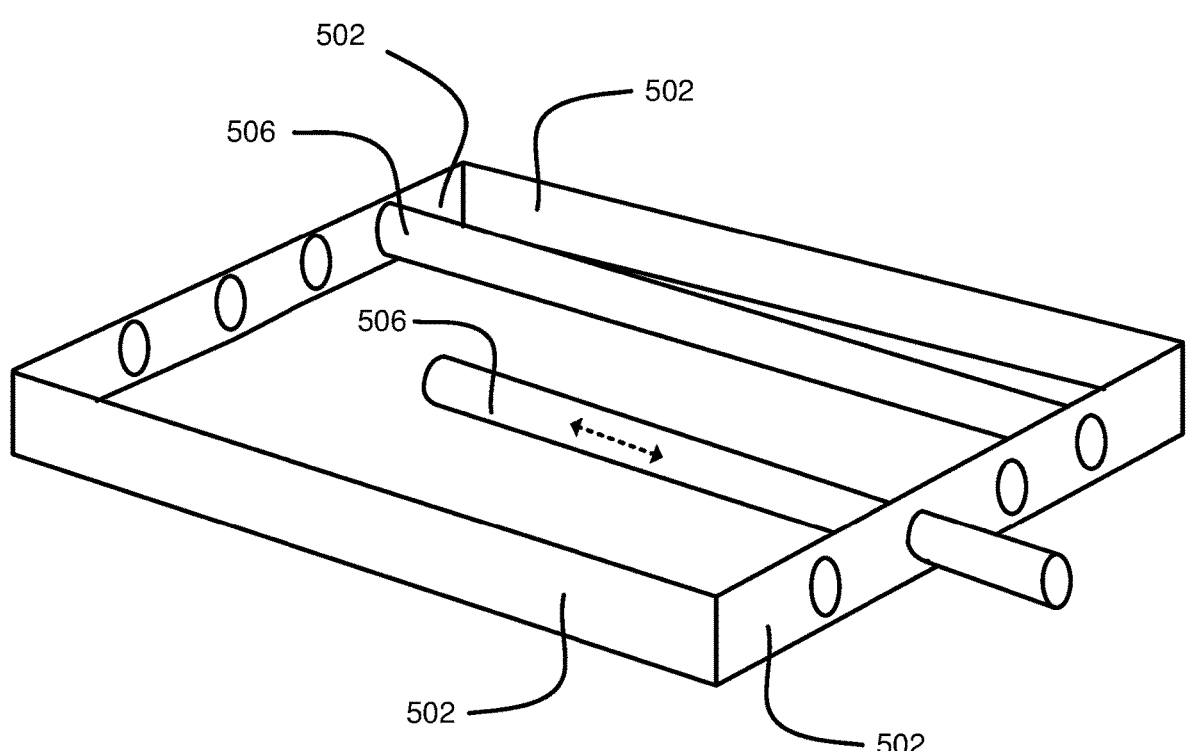

FIGS. 5A-5C are schematic illustrations of perspective views of components of the base portion 102 of the cart 100. The base portion 102 of the cart 100 serves several purposes in supporting and stabilizing the cart 100 during transport. The base portion 102 is partly responsible for supporting the weight of the cart and its contents, as well as providing stability and maneuverability. One of the main purposes of the base portion 102 is to distribute the weight of the cart and its contents evenly across the plurality of wheels 112. This helps ensure the cart 100 remains stable during transport and reduces the risk of the cart 100 tipping or rolling over. The base portion 102 also aids in absorbing shocks and impacts during transport, which can help to protect fragile or delicate items from damage.

In addition to providing support and stability, the base portion 102 plays a role in maneuverability of the cart 100. The design of the base portion 102, including the size and position of the wheels 112, impacts how easily the cart 100 can be steered and turned. For example, carts 100 with larger wheels 112 may be better suited for rough terrain or uneven surface, while carts with smaller wheels 112 may be more maneuverable in tight spaces.

The base portion 102 includes a plurality of sidewalls 502, and the quantity of sidewalls 502 will depend on the desired geometric configuration for the cart 100. In the example implementation illustrated in FIGS. 5A-5C, the base portion 102 includes four sidewalls for forming a quadrilateral (specifically rectangular) geometric configuration. The quantity of sidewalls 502 may be adjusted such that the base portion 102 includes three sidewalls 502 for forming a triangular configuration, five sidewalls 502 for forming a pentagonal configuration, six sidewalls 502 for forming a hexagonal configuration, and so forth.

The base portion 102 includes one or more crossbar supports 504 disposed through the sidewalls 502. The crossbar supports 504 are configured for receiving, stabilizing, and supporting a base crossbar 506, as shown in FIG. 5B. In some implementations, the crossbar supports 504 consist of a through-hole machined into the sidewall 502 itself, such that the crossbar supports 504 comprise a hole extending the entire width of the sidewall 502. In other implementations, the crossbar supports 504 consist of a rod support machined into the sidewall 502. The dimension of the rod support 502 is optimized to enable the corresponding base crossbar 506 to securely rest within the rod support.

As shown first in FIG. 5B, the base portion 102 includes one or more base crossbars 506. The base crossbars 506 are configured to be received and supported by the base crossbar supports 504. In most implementations, the geometries, and dimensions of the base crossbars 506 and the crossbar supports 504 are optimized such that the base crossbar 506 and the crossbar supports 504 form a tight interference fit. The lengths of the base crossbars 506 correspond with the lengths of the sidewalls 502 such that a base crossbar 506 may reach from one sidewall 502 having crossbar supports 504 to an opposing sidewall 502 having crossbar supports 504 to secure the base crossbar 506 in position. In some implementations, a base crossbar 506 is sized to fit flush between two base crossbar supports 504. In another implementation, the base crossbar 506 is slightly longer such that the base crossbar 506 extends through an entirety of a through-hole of the crossbar supports 504, and thus protrudes out relative to an exterior wall of the sidewall 502. One or more base crossbars 506 may be freely inserted or withdrawn from a base portion 102 through one or more base supports 504, as shown in FIG. 5C.

The base portion 102 includes any number of base crossbars 506 as desired based on, for example, the overall dimensions of the base portion 102, the intent for using the base crossbars 506 (e.g., whether the base crossbars 506 will form a shelf or support for carrying items), and the anticipated weight or load to be carried by the cart 100.

Figure 6A:
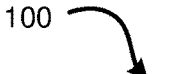
FIG. 6A is a straight-on end view of a cart configured for transporting a spool of wire or cable.
Figure 6B:
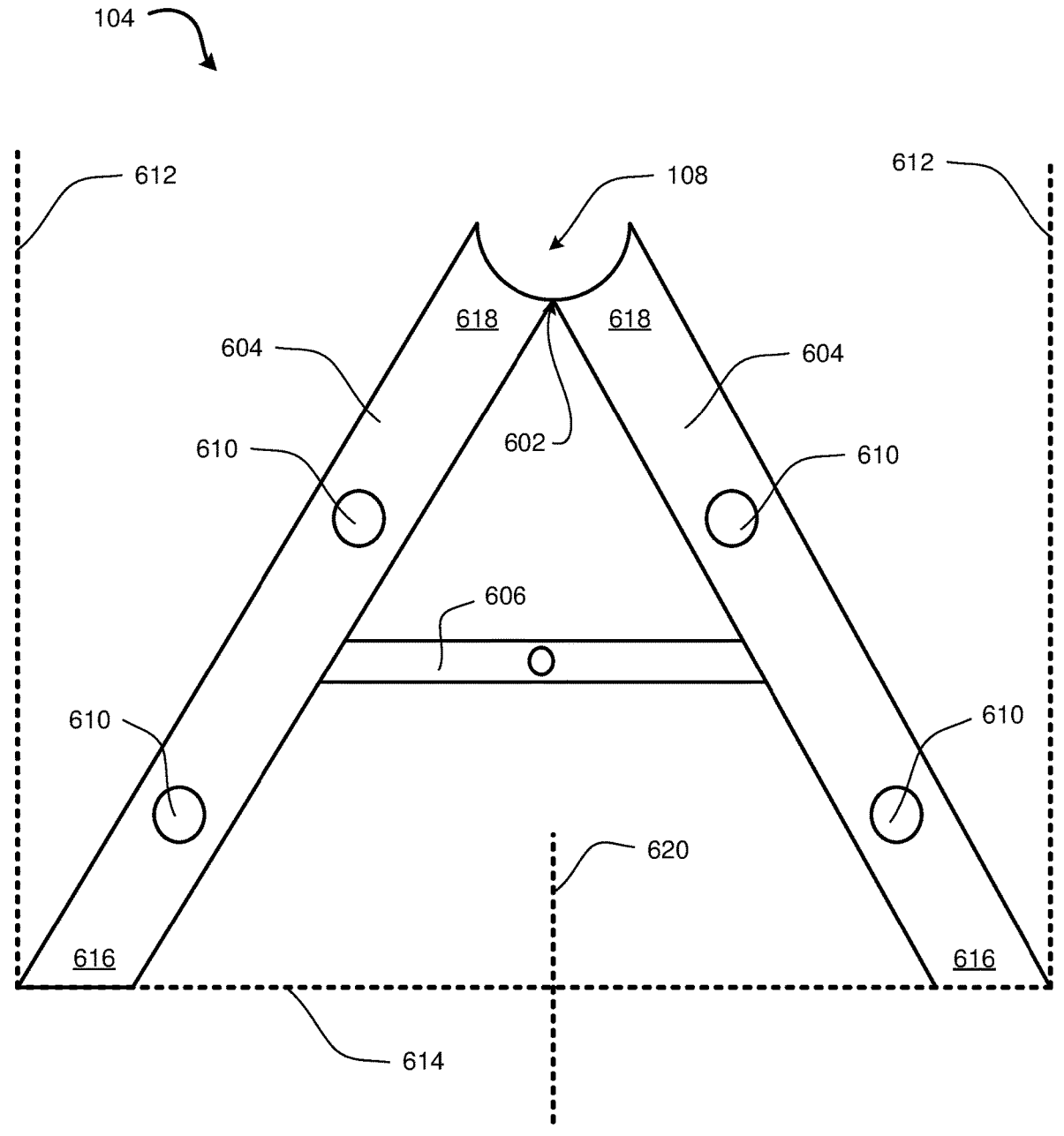
FIG. 6B is a schematic illustration of a straight-on end view of components of an A-frame truss of a frame portion of a cart configured for transporting a spool of wire or cable.
Figure 6C:
FIG. 6C is a schematic illustration of a top-down aerial view of components of an A-frame truss of a frame portion of a cart configured for transporting a spool of wire or cable.
Figure 6C:
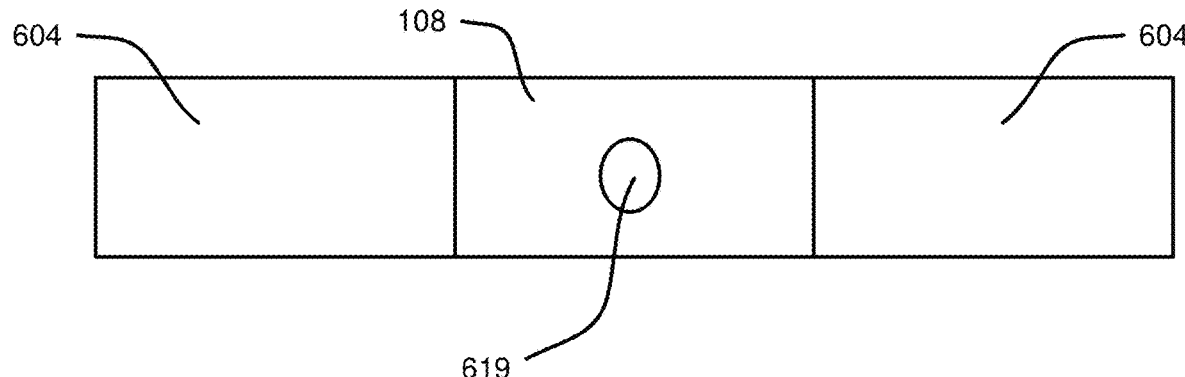
Figure 6D:
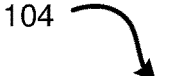
FIG. 6D is a schematic illustration of a perspective view of components of an A-frame truss of a frame portion of a cart configured for transporting a spool of wire or cable.
Figure 6E:
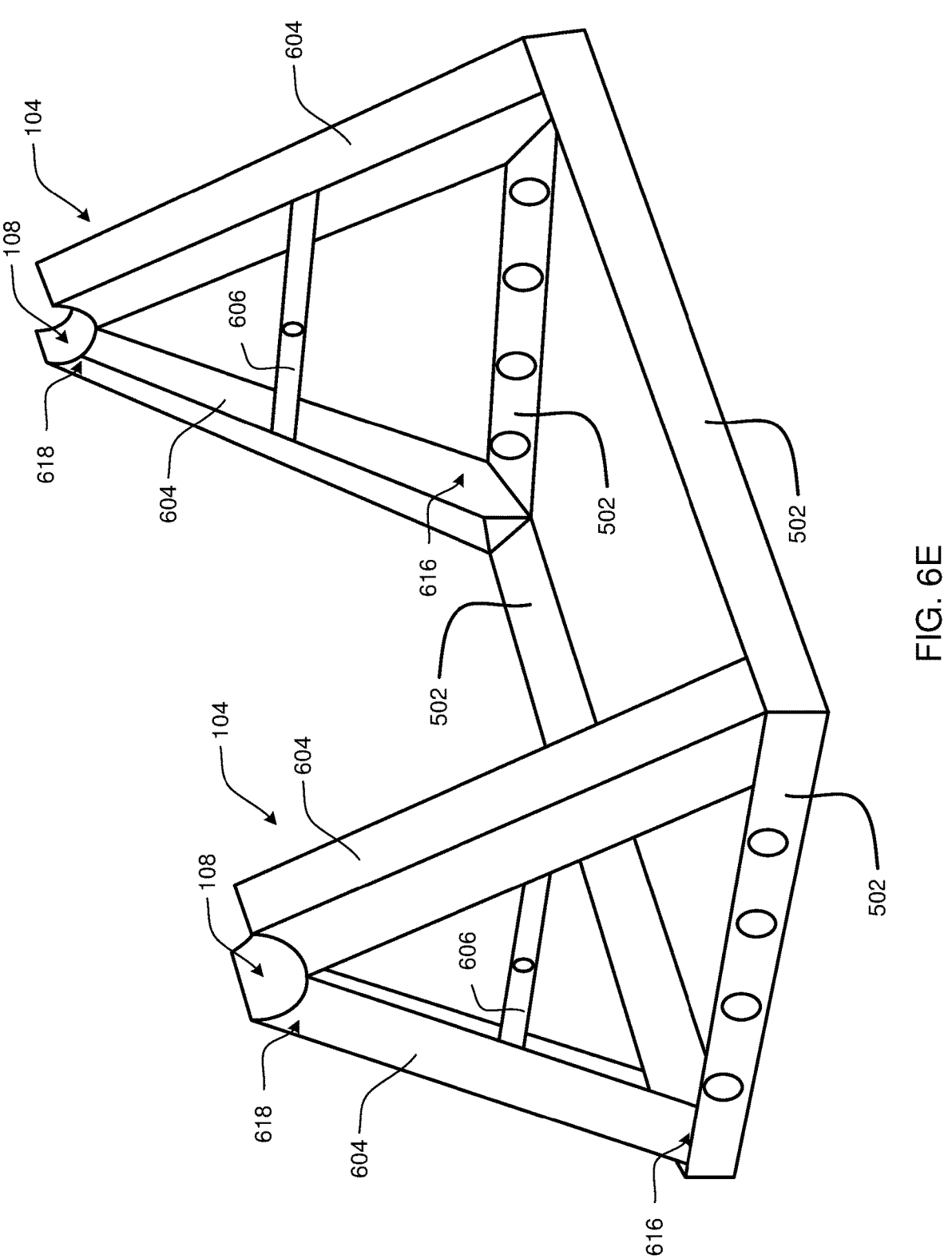
FIG. 6E is a schematic illustration of a perspective view of components of a cart configured for transporting a spool of wire or cable, wherein two A-frame trusses are shown attached to sidewalls of a base portion of the cart.
Figure 6F:
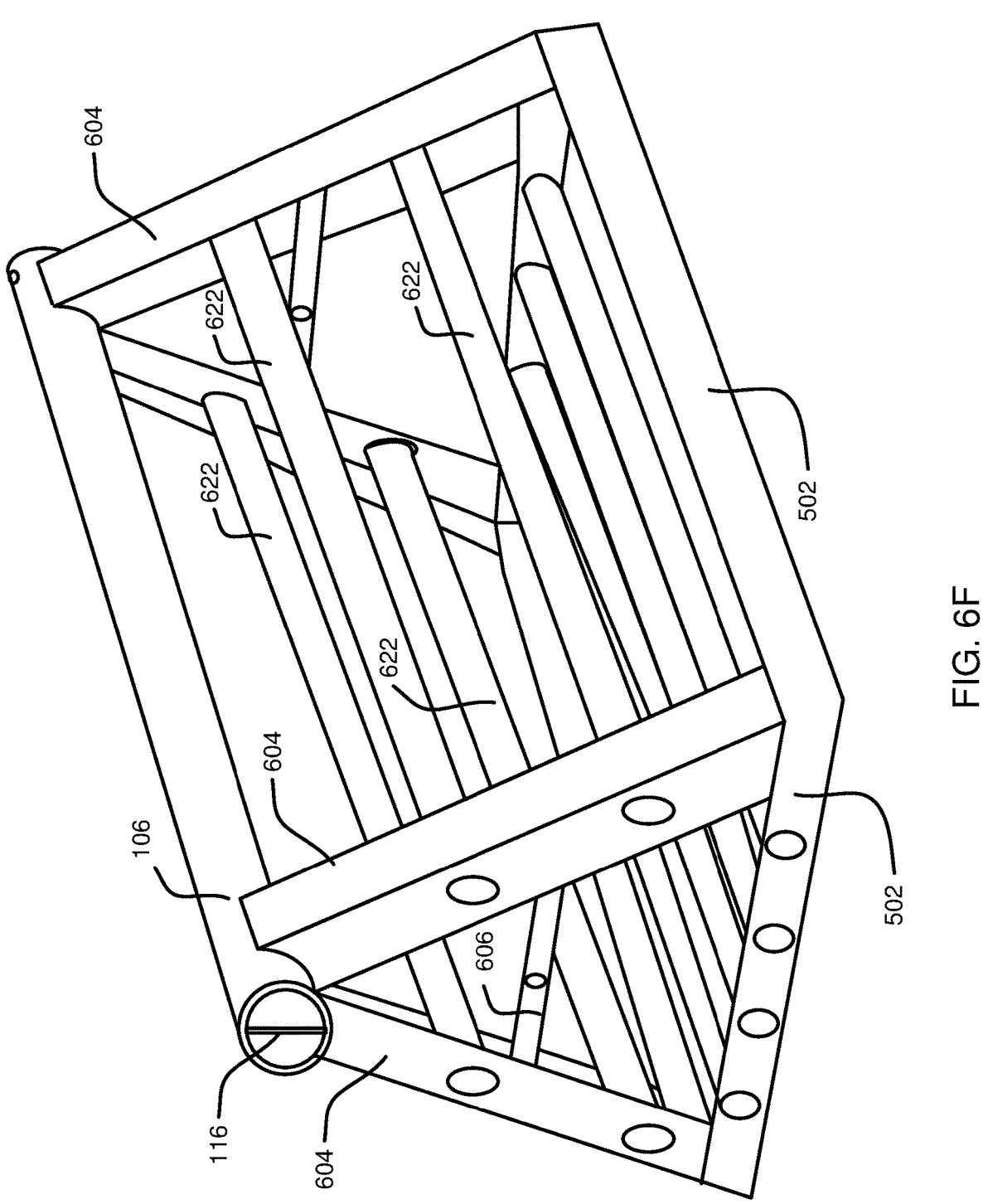
FIG. 6F is a schematic illustration of a perspective view of components of a cart configured for transporting a spool of wire or cable, wherein two A-frame trusses are shown attached to sidewalls of a base portion of the cart, and multiple additional spool crossbars are disposed through supports of the two A-frame trusses.

FIGS. 6A-6F are schematic illustrations depicting portions of the cart 100, and specifically depicting details pertaining to the A-frame trusses 104 of the cart 100. FIG. 6A illustrates a straight-on end view of the entire cart 100, including the base portion 102 and the A-frame trusses 104. Due to the perspective in FIG. 6A, only one of the A-frame trusses 104 is visible. FIG. 6B is a schematic illustration of a straight-on side view of an A-frame truss 104 of the cart 100. FIG. 6C is a schematic illustration of a top-down aerial view of an A-frame truss 104 of the cart 100. FIG. 6D is a schematic illustration of a perspective view of an A-frame truss 104 of the cart 100. FIG. 6E is a schematic illustration of a perspective view of two A-frame trusses 104 of the cart 100 attached to the base portion 102. FIG. 6F is a schematic illustration of a perspective view of two A-frame trusses 104 of the cart 100 attached to the base portion 102.

The cart 100 includes two or more A-frame trusses 104 attached to the base portion 102. It should be understood that the cart 100 may include any number of A-frame trusses 104, and the quantity of A-frame trusses 104 may be optimized based on an anticipated weight or size of the one or more spools to be hung on the spool crossbar 106. Additionally, the quantity of A-frame trusses 104 will be optimized based on the length of the base portion 102 and the number of spools or wires to be carried by the spool crossbar 106. The A-frame configuration of the cart 100 represents an improvement over traditional pull carts at least because it enables greater stability when holding, transporting, and storing wires that may be particularly heavy or cumbersome.

The A-frame trusses 104 are made up of two crosswise beams 604. As shown specifically in FIG. 6B, the crosswise beams 604 each consist of a proximal end 616 and a distal end 618, wherein the proximal/distal monikers are named relative to the base portion 102. Thus, the proximal end 616 of the crosswise beam 604 is configured to be attached to the base portion 102, while the distal end 618 of the crosswise beam 604 forms a portion of the rod support 108 at the apex 602 of the A-frame truss 104. The crosswise beams 604 are oriented in a diagonal or substantially diagonal orientation relative to a horizontal reference line 614 and a vertical reference line 612. The horizontal reference line 614 is parallel to the base portion 102 and the vertical reference line 612 is perpendicular to the base portion 102. The apex 602 of the two crosswise beams 604 is disposed at a horizontal center point 620 relative to the proximal ends 616 of the two crosswise beams 604. The substantially diagonal orientations of the crosswise beams 604 causes the A-frame truss 104 to comprise the "A" shaped configuration.

The crosswise beams 604 include one or more through-holes 610 disposed therethrough. The through-holes 610 are configured to receive a rod, such that the through-holes 610 may support additional spool crossbars 622 (first shown in FIG. 6F) for holding additional spools. The through-holes 610 additionally reduce the overall weight of the cart 100 to enable easier transport of the cart 100.

The A-frame trusses 104 include one or more crossbars 606 that extend from one crosswise beam 604 to the opposite crosswise beam 604. A A-frame crossbar 606 may join two crosswise beams 604 by attaching to one side of each support arm and extending between the two. The A-frame crossbar 606 may be positioned central to a length of two attached crosswise beams 604 or may be positioned elsewhere along each crosswise beam 604, and thus the length of the A-frame crossbar 606 may scale according to the implementation. The A-frame crossbar 606 may itself comprise a support crossarm crossbar support into which a crossbar may insert.

The crosswise beams 604 may be solid or hollow three-dimensional constructs in some implementations while in others they may instead be formed from two substantially flat pieces of metal or other material joined at an angle. One or more through-holes 610 may be disposed along a length of the crosswise beams 604. In implementations where the crosswise beams 604 are three-dimensional constructs, the through-holes 610 may extend all the way through the crosswise beams 604 or may only be disposed along one side. The A-frame crossbar 606 may join the crosswise beams 604 at a central position relative to the length of each crosswise beam 604. The A-frame crossbar 606 may be secured in a manner such as by welding, and that weld may be at a "front" or "rear" position relative to the crosswise beams 604.

The distal ends 618 of the crosswise beams 604 form the rod support 108, which is configured to hold the spool crossbar 106. The rod support 108 may include a semicircular cross-sectional geometry. The dimensions and geometry of the rod support 108 are optimized based on the dimensions of the corresponding spool crossbar 106. Further, the dimensions of the spool crossbar 106 will be determined based on the anticipated interior dimensions of the arbor shaft of a spool.

The spool crossbar 106 may be positioned to fit within the rod support 108 formed at an apex 602 of an A-frame truss 104, wherein the apex 602 is formed at the distal ends 618 of two or more of the crosswise beams 604. The spool crossbar 106 may be secured to the rod support via a fastener 116. The fastener 116 may attach by insertion through a fastener through-hole located on a surface of the spool crossbar 106. The fastener 116 may extend through the spool crossbar 106 and into a rod support through-hole (not shown) that is disposed within the rod support 108. The fastener 116 can be utilized to prevent the spool crossbar 106 from rotating or sliding back and forth.

The cart 100 is configured to be used with varying spool crossbars 106 having different cross-sectional diameters. In an implementation, the dimensions of the rod support 108 integrated into the A-frame truss 104 is optimized based on a largest anticipated cross-sectional diameter for the spool crossbar 106. In this implementation, additional size customizers may be disposed within the rod support 108 to reduce the size within the rod support 108, and thus enable the rod support 108 to snugly support a spool crossbar 106 having a smaller cross-sectional diameter. These additional size customizers may include, for example padding to be disposed within the rod support 108, rigid semi-circular supports to be clipped into the rod support 108 or otherwise releasably affixed to the rod support 108, and so forth.

The rod support 108 may have a semi-circular geometry as depicted herein. However, in additional implementations, the rod support 108 may additionally include a releasable clip or lever arm to close the rod support 108 and thus provide a complete circular geometry for the rod support 108. These releasable clips and/or lever arms may be implemented to lock the spool crossbar 106 into the rod support 108 and prevent the spool crossbar 106 from unintentionally lifting up and out of the rod support 108. The rod support 108 may comprise a concave surface formed at an apex of two joined crosswise beams 604. A spool crossbar 106 may be sized to fit flush within a rod support 108 and may be secured to the rod support 108 by a fastener 116 such as a screw, bolt, or other similar article.

Seen from above, as shown in FIG. 6C, the crosswise beams 604 of the A-frame truss 104 come together to form the rod support 108. Disposed within the rod support 108 there may be one or more rod support through-holes 619. The rod support through-hole 619 may be utilized to secure a crossbar or similar article to the rod support 108 and thus to the A-frame truss 104 of the cart 100 using fastener implements. Such implements may include screws, bolts, or similar implements. While one rod support through-hole 619 is shown in FIG. 6C, it is understood that there may be more distributed within the rod support as desired.

As shown in FIG. 6E, the cart 100 includes two or more A-frame trusses 104 each attached to the base portion 102. The two or more A-frame trusses 104 provide support for the spool crossbar 106. It should be understood that the cart 100 may include any number of A-frame trusses 104 depending on the length of the base portion 102, the intended size or weight of the items to be carried, the intended primary use (e.g., transporting versus storage), and so forth. Each of the A-frame trusses 104 is attached to the base portion 102 at a proximal end. The crosswise beams 604 of the A-frame trusses 104 are positioned such that the proximal end 616 attaches to a corner where two sidewalls 502 of the base portion 102 meet. In some implementations, the proximal ends 616 of the crosswise beams 604 attach within the sidewalls 502 of the base portion 102. In other implementations, the crosswise beams 604 are attached to upper edges of the sidewalls 502, such as by welding.

As shown in FIG. 6F, in additional to the spool crossbar 106, the cart 100 may include additional spool crossbars 622 inserted through one or more through-holes 610 of the crosswise beams 604 and extending from one A-frame truss 104 to a corresponding crosswise beam 604 on another A-frame truss 104. The additional spool crossbars 622 provide additional storage for holding other spools of wire, wire wrapped without a spool, tools, equipment, and so forth. Additional spool crossbars 622 or the base cross bars 506 may be secured by a fastener implement similar to the fastener utilized to secure the spool crossbar 106 within the rod support 108.

Figure 7A:
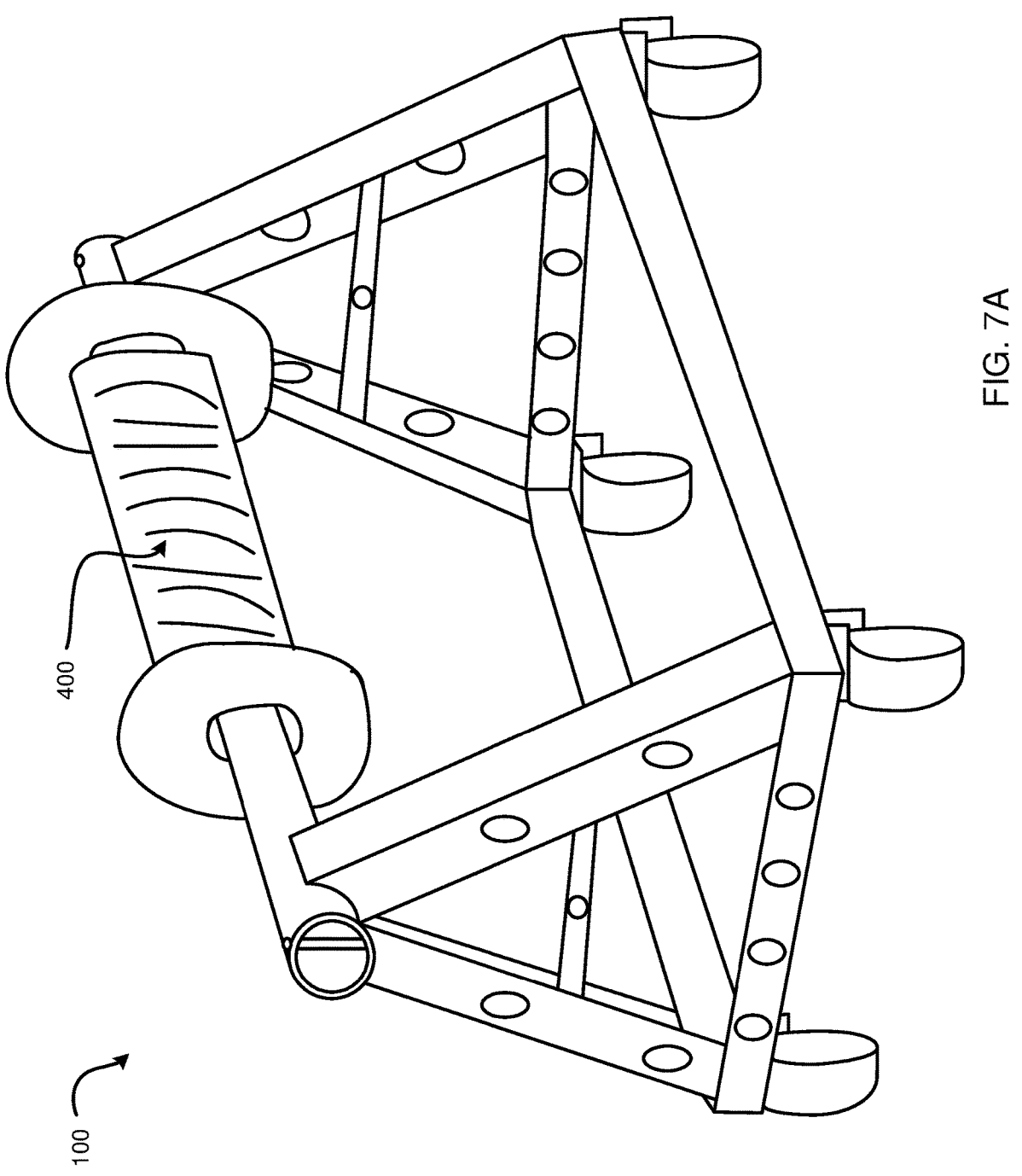
FIG. 7A is a schematic illustration of a cart configured for transporting a spool of wire or cable, wherein a spool crossbar of the cart is disposed through an arbor hole of a spool.
Figure 7B:
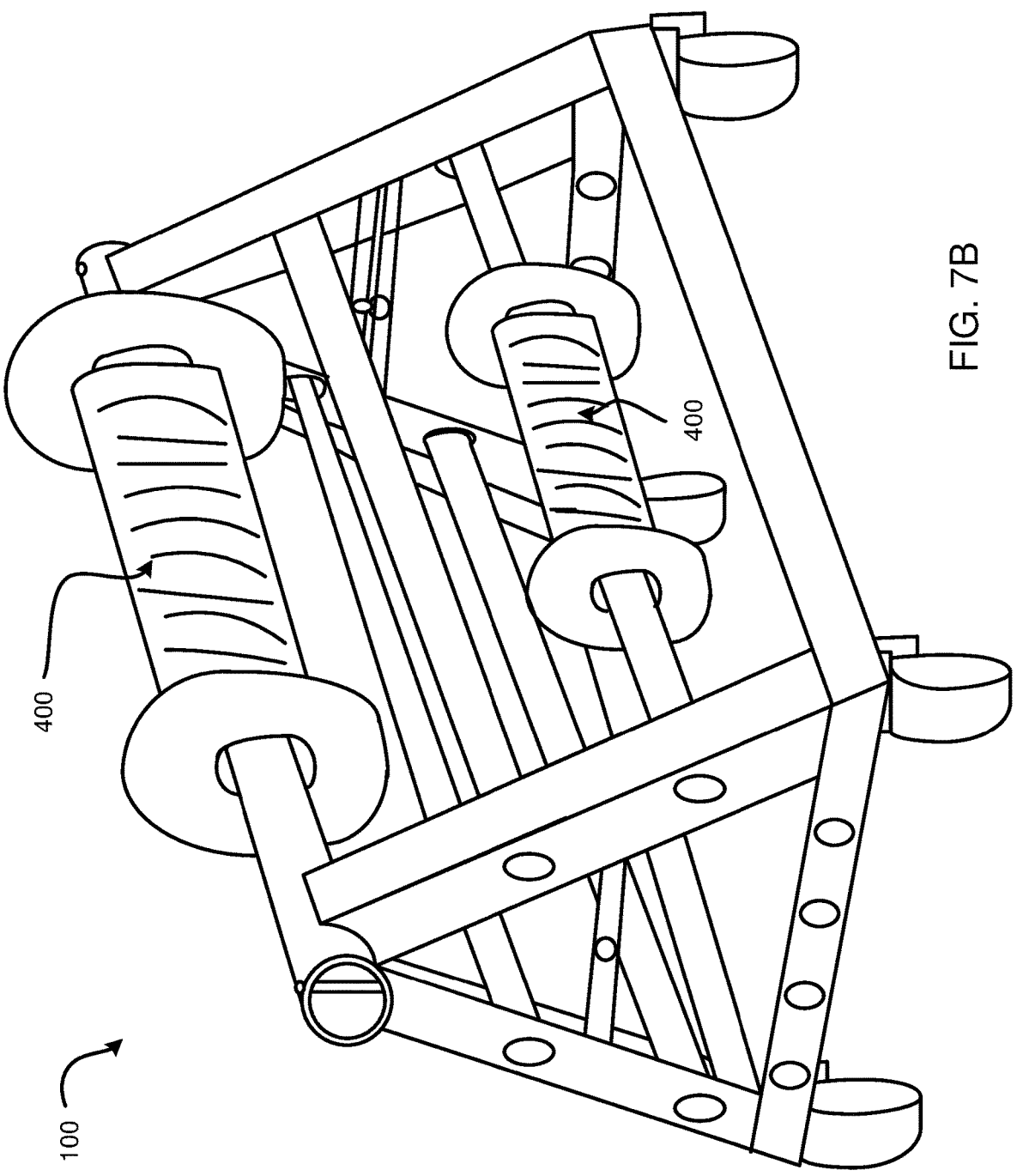
FIG. 7B is a schematic illustration of a cart configured for transporting a spool of wire or cable, wherein a spool crossbar of the cart is disposed through an arbor hole of a spool, and wherein an additional spool crossbar of the cart is disposed through an arbor hole of an additional spool.

FIGS. 7A-7B are schematic illustrations of perspective views of the cart 100, wherein the cart 100 includes one or more spools 400 of wire or cable. As shown in FIG. 7B, additional spools 400 may be installed on additional spool crossbars 622. The overall shape and sizing of the A-frame cart 100 may provide a degree of stability such that the cart remains upright and mobile regardless of whether any cabling or spools 400 are distributed evenly across one or more spool crossbars 106, 622 . . . .

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

In the foregoing Detailed Description, various features of the disclosure are grouped together in a single implementation for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed implementation. Thus, the following claims are hereby incorporated into this Detailed Description by this reference, with each claim standing on its own as a separate implementation of the disclosure.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements. Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the following claims.

EXAMPLES

The following examples pertain to further embodiments.

Example 1 is an assembly for transporting and storing wiring, the assembly comprising a base, one or more wheels, an A-frame support, and a crossbar.

Example 2 is an assembly according to Example 1, wherein the base is a rectangular base, and wherein the rectangular base comprises one or more base crossbars.

Example 3 is an assembly according to Examples 1 or 2, wherein the A-frame support comprises two A-frame supports each positioned on opposite ends of the base.

Example 4 is an assembly according to any of Examples 1-3, wherein the crossbars of the rectangular base are freely removable.

Example 5 is an assembly according to any of Examples 1-4, wherein the crossbars of the rectangular base are welded to the base.

Example 6 is an assembly according to any of Examples 1-5, wherein an apex of the A-frame support comprises a rod support.

Example 7 is an assembly according to any of Examples 1-6, wherein the crossbar is seated in the rod support and secured to the rod support by one or more fastener implements.

Example 8 is an assembly according to any of Examples 1-7, wherein the crossbar is secured to the support by one or more fastener implements.

Example 9 is a cart. The cart includes an A-frame truss comprising a plurality of crosswise beams, wherein the plurality of crosswise beams comprises: a proximal end attached to a cart base; and a distal end opposite the proximal end, wherein the distal end forms an apex of the A-frame truss. The cart includes a rod support configured to receive a spool crossbar, wherein the rod support is disposed at the apex of the A-frame truss.

Example 10 is a cart as in Example 9, wherein the rod support comprises a semi-circular cross-sectional geometry having an interior diameter.

Example 11 is a cart as in any of Examples 9-10, further comprising a spool crossbar having a circular cross-sectional geometry having an exterior diameter; wherein the exterior diameter of the spool crossbar is substantially equivalent to the interior diameter of the rod support.

Example 12 is a cart as in any of Examples 9-11, further comprising a spool that comprises an arbor hole disposed through a barrel; wherein the exterior diameter of the spool crossbar is sized such that the spool crossbar is disposed through the arbor hold of the spool for storing on the spool on the cart.

Example 13 is a cart as in any of Examples 9-12, further comprising a crossbar disposed between a first crosswise beam and a second crosswise beam of the plurality of crosswise beams; wherein the crossbar is attached to the first crosswise and the second crosswise beam.

Example 14 is a cart as in any of Examples 9-13, wherein the cart base comprises a sidewall, and wherein the proximal ends of the plurality of crosswise beams are attached to the sidewall; and wherein the crossbar is disposed substantially parallel to the sidewall of the cart base.

Example 15 is a cart as in any of Examples 9-14, wherein the cart base comprises a plurality of sidewalls formed in a quadrilateral geometry; wherein the proximal end of a first crosswise beam is attached to two sidewalls of the plurality of sidewalls at a first corner of the quadrilateral geometry; wherein the proximal end of a second crosswise beam is attached to two sidewalls of the plurality of sidewalls at a second corner of the quadrilateral geometry; wherein the proximal end of a third crosswise beam is attached to two sidewalls of the plurality of sidewalls at a third corner of the quadrilateral geometry; and wherein the proximal end of a fourth crosswise beam is attached to two sidewalls of the plurality of sidewalls at a fourth corner of the quadrilateral geometry.

Example 16 is a cart as in any of Examples 9-15, wherein the cart base comprises: ma plurality of sidewalls, wherein the proximal ends of the plurality of crosswise beams are attached to the cart base at the plurality of sidewalls; and a plurality of wheels each attached to the cart base at one or more sidewalls of the plurality of sidewalls.

Example 17 is a cart as in any of Examples 9-16, wherein the cart base further comprises: a plurality of crossbar supports, wherein each of the plurality of crossbar supports comprises a hole disposed through a sidewall of the plurality of sidewalls; and one or more crossbars, wherein each of the one or more crossbars is configured to be disposed through at least one of the plurality of crossbar supports.

Example 18 is a cart as in any of Examples 9-17, wherein the plurality of crosswise beams of the A-frame truss further comprise one or more through-holes disposed therethrough.

Example 19 is a cart as in any of Examples 9-18, wherein the plurality of crosswise beams are disposed diagonal relative to the cart base and the apex of the A-frame truss.

Example 20 is a cart as in any of Examples 9-19, wherein the cart is configured for storing and transporting wire or cable, and wherein the wire or cable is wrapped around the spool crossbar.

Example 21 is a cart as in any of Examples 9-20, wherein the rod support disposed at the apex of the A-frame truss further comprises a fastener configured to releasably secure the spool crossbar to the rod support.

Example 22 is a cart as in any of Examples 9-21, wherein the rod support disposed at the apex of the A-frame truss comprises a semi-circular geometry; wherein the rod support further comprises a hinged lever configured to close the semi-circular geometry to form a complete circular geometry; and wherein the complete circular geometry is configured to be disposed around the spool crossbar when the spool crossbar is resting on the apex of the A-frame truss.

Example 23 is a cart as in any of Examples 9-22, wherein the cart base comprises a quadrilateral geometry, and wherein the proximal ends of each of the plurality of crosswise beams is attached to the cart base at a corner defined by the quadrilateral geometry.

Example 24 is a cart as in any of Examples 9-23, wherein the cart comprises two A-frame trusses; wherein a first A-frame truss is attached to the cart base at two corners defined by the quadrilateral geometry at a first side of the cart base; and wherein a second A-frame truss is attached to the cart base at two corners defined by the quadrilateral geometry at a second side of the cart base, wherein the second side is opposite the first side.

Example 25 is a cart as in any of Examples 9-24, wherein the cart comprises two A-frame trusses; wherein the spool crossbar comprises a proximal end and a distal end; wherein a first rod support defined by a first A-frame truss is configured to receive the first end of the spool crossbar to support the spool crossbar; and wherein a second rod support defined by a second A-frame truss is configured to receive the second end of the spool crossbar to support the spool crossbar.

Example 26 is a cart as in any of Examples 9-25, wherein the cart base comprises a plurality of sidewalls and one or more crossbars removably disposed through two or more of the plurality of sidewalls.

Example 27 is a cart as in any of Examples 9-26, wherein the spool crossbar is seated in the rod support and secured to the rod support by one or more fasteners.

Example 28 is a cart as in any of Examples 9-27, wherein the cart comprises two or more A-frame trusses, and wherein the plurality of crosswise beams of each of the two or more A-frame trusses comprises one or more through-holes disposed therethrough configured for receiving an additional spool crossbar.

What is claimed is:

1. A cart comprising:
a cart base;
a spool crossbar;
an A-frame truss comprising a plurality of crosswise beams, wherein the plurality of crosswise beams comprises:
a proximal end attached to the cart base;
a distal end opposite the proximal end; and
a rod support configured to receive the spool crossbar;
wherein the distal end of the plurality of crosswise beams forms an apex of the A-frame truss;
wherein at least two of the plurality of crosswise beams are angled from the cart base to the apex of the A-frame truss;
wherein the rod support comprises a semi-circular cross-sectional geometry having an interior diameter that is formed at a location where the distal ends of the two of the plurality of crosswise beams meet to form the apex of the A-frame;
wherein the spool crossbar comprises a surface that interacts with the semi-circular cross-sectional geometry of the rod support.

2. The cart of claim 1, wherein the geometry of the spool crossbar comprises a circular cross-sectional geometry having an exterior diameter;
wherein the exterior diameter of the spool crossbar is substantially equivalent to the interior diameter of the rod support.

3. The cart of claim 2,
wherein the exterior diameter of the spool crossbar is sized such that the spool crossbar is configured to be disposed through an arbor hole of a spool in order to store the spool on the spool crossbar of the cart.

4. The cart of claim 1, further comprising an A-frame crossbar disposed between a first crosswise beam and a second crosswise beam of the plurality of crosswise beams;
    wherein the A-frame crossbar is attached to the first crosswise beam and the second crosswise beam.

5. The cart of claim 4, wherein the cart base comprises a sidewall, and wherein the proximal ends of the plurality of crosswise beams are attached to the sidewall; and
    wherein the A-frame crossbar is disposed substantially parallel to the sidewall of the cart base.

6. The cart of claim 1, wherein the cart base comprises a plurality of sidewalls formed in a quadrilateral geometry;
    wherein the proximal end of a first crosswise beam is attached to two sidewalls of the plurality of sidewalls at a first corner of the quadrilateral geometry;
    wherein the proximal end of a second crosswise beam is attached to two sidewalls of the plurality of sidewalls at a second corner of the quadrilateral geometry;
    wherein the proximal end of a third crosswise beam is attached to two sidewalls of the plurality of sidewalls at a third corner of the quadrilateral geometry; and
    wherein the proximal end of a fourth crosswise beam is attached to two sidewalls of the plurality of sidewalls at a fourth corner of the quadrilateral geometry.

7. The cart of claim 1, wherein the cart base comprises:
    a plurality of sidewalls, wherein the proximal ends of the plurality of crosswise beams are attached to the cart base at the plurality of sidewalls; and
    a plurality of wheels each attached to the cart base at one or more sidewalls of the plurality of sidewalls.

8. The cart of claim 7, wherein the cart base further comprises:
    a plurality of crossbar supports, wherein each of the plurality of crossbar supports comprises a hole disposed through a sidewall of the plurality of sidewalls; and
    one or more crossbars, wherein each of the one or more crossbars is configured to be disposed through at least one of the plurality of crossbar supports.

9. The cart of claim 1, wherein the plurality of crosswise beams of the A-frame truss further comprise one or more through-holes disposed therethrough.

10. The cart of claim 1, wherein the plurality of crosswise beams are angled such that each of the plurality of crosswise beams are disposed diagonal relative to a horizontal reference line and a vertical reference line, wherein the horizontal reference line is disposed substantially parallel to a sidewall of the cart base, and wherein the vertical reference line is disposed substantially perpendicular to the sidewall of the cart base.

11. The cart of claim 1, wherein the cart is configured for storing and transporting wire or cable, and wherein the wire or cable is configured to be wrapped around the spool crossbar.

12. The cart of claim 1, wherein the rod support disposed at the apex of the A-frame truss further comprises a fastener configured to releasably secure the spool crossbar to the rod support such that the spool crossbar is prohibited from rotating.

13. The cart of claim 1, wherein:
    the rod support further comprises a hinged lever configured to close the semi-circular geometry to form a complete circular geometry; and
    the complete circular geometry is configured to be disposed around the spool crossbar when the spool crossbar is resting on the apex of the A-frame truss.

14. The cart of claim 1, wherein the cart base comprises a quadrilateral geometry, and wherein the proximal ends of each of the plurality of crosswise beams is attached to the cart base at a corner defined by the quadrilateral geometry.

15. The cart of claim 14, wherein the cart comprises two A-frame trusses;
    wherein a first A-frame truss is attached to the cart base at two corners defined by the quadrilateral geometry at a first side of the cart base; and
    wherein a second A-frame truss is attached to the cart base at two corners defined by the quadrilateral geometry at a second side of the cart base, wherein the second side is opposite the first side.

16. The cart of claim 1, wherein the cart comprises two A-frame trusses;
    wherein the spool crossbar comprises a first end and a second end;
    wherein a first rod support defined by a first A-frame truss is configured to receive the first end of the spool crossbar to support the spool crossbar; and
    wherein a second rod support defined by a second A-frame truss is configured to receive the second end of the spool crossbar to support the spool crossbar.

17. The cart of claim 1, wherein the cart base comprises a plurality of sidewalls and one or more crossbars removably disposed through two or more of the plurality of sidewalls.

18. The cart of claim 1, wherein the spool crossbar is seated in the rod support and secured to the rod support by one or more fasteners.

19. The cart of claim 1, wherein the cart comprises two or more A-frame trusses, and wherein the plurality of crosswise beams of each of the two or more A-frame trusses comprises one or more through-holes disposed therethrough configured for receiving an additional spool crossbar.

20. A cart comprising:
    a cart base;
    a spool crossbar; and
    an A-frame truss comprising a first crosswise beam and a second crosswise beam, wherein the first crosswise beam and the second crosswise beam each comprise:
    a proximal end attached to the cart base;
    a distal end opposite the proximal end; and
    a recessed portion formed in the distal end;
    wherein the first crosswise beam and the second crosswise beam are angled from the cart base to the apex of the A-frame truss such that the distal end of the first crosswise beam and the distal end of the second crosswise beam meet to form an apex of the A-frame truss;
    wherein the recessed portion of the distal end of the first crosswise beam and the recessed portion of the distal end of the second crosswise beam form a rod support comprising a semi-circular cross-sectional geometry;
    wherein the spool crossbar comprises a geometry corresponding to the semi-circular cross-sectional geometry of the rod support.

* * * * *